Feb. 13, 1968   E. WALTHER   3,368,957
SILVER-SILVER CHLORIDE ELECTRODE OF HIGH CURRENT-CARRYING
CAPACITY FOR VOLTAGE MEASUREMENT IN A SYSTEM PROVIDING
CATHODIC PROTECTION AGAINST CORROSION
Filed July 1, 1965

United States Patent Office 3,368,957
Patented Feb. 13, 1968

3,368,957
SILVER-SILVER CHLORIDE ELECTRODE OF HIGH CURRENT-CARRYING CAPACITY FOR VOLTAGE MEASUREMENT IN A SYSTEM PROVIDING CATHODIC PROTECTION AGAINST CORROSION
Emil Walther, Erlangen, Germany, assignor to Siemens Aktiengesellschaft, Munich, Germany, a corporation of Germany
Filed July 1, 1965, Ser. No. 468,802
Claims priority, application Germany, July 2, 1964, S 91,835
6 Claims. (Cl. 204—195)

My invention relates to silver-silver chloride electrodes of high current-carrying capacity for measuring voltage in a system providing cathodic protection against corrosion.

Silver-silver chloride electrodes are used predominantly for voltage measurement at cathodically protected structures such as the hulls of ships, steel sheet piling, and the like, in sea water. These electrodes consist of a silver rod or wire coated with fused silver chloride. They suffer from the disadvantage of having a very low current-carrying capacity. They conduct measuring currents of only a few microamperes which must be suitably amplied and, because the amplification as a rule cannot be carried out as the measurement location proper, this measuring current possesses a relatively large interference or noise component due to the necessity for transmitting the current over added circuitry. Furthermore, the mechanical strength or stability of the known electrodes, is not sufficient for all the cases usually found in practice.

It is accordingly an object of my invention to provide a mechanically rugged measuring electrode of high current-carrying capacity and long useful life.

With the foregoing and other objects in view, in accordance with my invention, I provide alternate plates or lamellae of silver and silver chloride on a silver base member, the silver lamellae and the silver base member being electrically connected and all of the lamellae being mutually joined in shape-constrained or positive mechanical manner.

My invention takes advantage of the fact that the current-carrying capacity of a silver-silver chloride electrode depends upon the size of the three-phase boundary of silver-silver chloride-electrolyte. This boundary is particularly large with outstanding mechanical strength if the electrode is constructed in accordance with my invention. The electrolyte does not act only at the outer periphery of the abutting locations of the adjacent lamellae, but rather penetrates into the joints intermediate the adjacent lamellae thereby enlarging the active surfaces thereof. This action is accelerated by subjecting the electrode in advance to a cathodic current-loading. Moreover the amount of nominal load can be influenced by varying the length of the periphery and the number of lamellae or plates. The plates can also be pressure-bonded to the silver support member. A particularly advantageous and durable type of fastening or joining is effected by providing the respective plates with an inner thread so as to thereby screw them onto an outer thread formed on the silver base member.

Other features which are considered as characteristic for the invention are set forth in the appended claims.

Although the invention is illustrated and described herein as embodied in a silver-silver chloride electrode of high current-carrying capacity for measuring the voltage in a system providing cathodic protection against corrosion, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of a specific embodiment thereof when read in connection with the accompanying drawings, in which.

Figure 1:
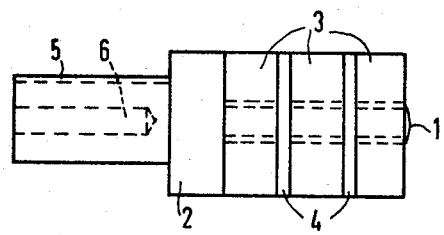
FIG. 1 is a longitudinal view of a measuring element constructed in accordance with my invention.

Referring now to the drawings and first particularly to FIG. 1 there is shown a measuring element comprising a threaded insert body or base member 1 of pure silver with a plate-shaped extension 2. In alternating succession, disc-shaped plates or lamellae of silver chloride 3 and pure silver 4 are threaded on the threaded member 1, the silver chloride plates having a relatively greater thickness than the silver plates 4. The silver chloride discs 3 can be cast from a melt, and can also advantageously be produced by the compression of silver chloride powder. The silver base member 1 is also provided with an externally threaded extension 5 serving as a means for mechanically securing the measuring electrode to a suitable support member (not shown). A bore 6 is formed in the threaded extension 5, providing a socket for a suitable electrical contacting plug so that an electrical connection with the measuring element can be effected in a simple manner.

Figure 2:
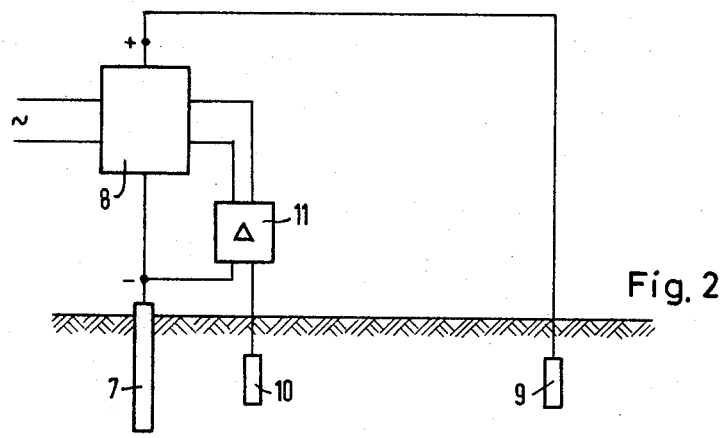
FIG. 2 is a diagrammatic view of a circuit for protecting against corrosion in which the measuring element of FIG. 1 is connected.

FIG. 2 shows the connection of a measuring electrode 10 in a circuit for affording protection against corrosion by impressed current. An object 7 which is to be protected against corrosion by the environment in which it is located is connected electrically to the negative pole or cathode of a direct current source 8 such as an AC rectifier and is supplied with an impressed protective current through the anode 9. The positive pole of the direct current source 8 is electrically connected with the anode 9. The direct current source 8 is controllable by means of the difference in potential between the measuring element 10 and the object 7 which is to be protected against corrosion, this potential difference being amplified and fed to the direct current source through an amplifier 11 of conventional construction. The measuring element 10 thereby serves as reference electrode.

Figure 3:
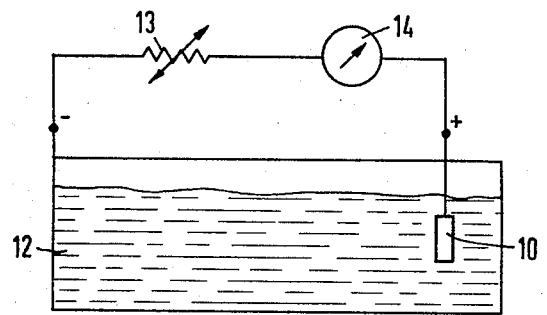
FIG. 3 is a diagrammatic view of a circuit for cathodic pre-loading of the measuring element of FIG. 1 with current.

Means for previously applying a cathodic electric charge to the measuring element is shown in FIG. 3. For this purpose the measuring element 10 is inserted in an electrolyte bath 12 and an electrical circuit is produced between the housing or container of the electrolyte bath and the measuring element 10, the circuit including an adjustable resistance 13 and current meter 14. By means of the variable resistance 13, the amount of cathodic precharging of current which is readable from the current meter 14 can be adjusted.

I claim:

1. Electrode of high current-carrying capacity for measuring voltage in a system providing cathodic protection against corrosion, comprising a plurality of lamellae alternately consisting of silver and silver chloride respectively, said lamellae being mechanically fixed to one another, and a silver base member in engagement with said plurality of lamellae, said base member being electrically connected to said silver lamellae.

2. Electrode of high current-carrying capacity for measuring voltage in a system providing cathodic protection against corrosion, comprising a plurality of stacked plates alternately consisting of silver and silver chloride respectively, and a silver base member formed with an external thread, said plates being threadedly secured on said silver base member so that said plates are in positive mechanical connection with one another, said silver plates being electrically connected to said silver base member.

3. Electrode of high current-carrying capacity for measuring voltage in a system providing cathodic protection against corrosion, comprising a plurality of plates abutting one another face-to-face, said plates consisting alternately of silver and silver chloride respectively, and formed with an aligned threaded bore, and a silver base member comprising an externally threaded rod extending through said bore in mutual threaded engagement with said plates so that said plates are in positive mechanical connection with one another, said silver plates being electrically connected to said silver base member.

4. Electrode of high current-carrying capacity for measuring voltage in a system providing cathode protection against corrosion, comprising a plurality of plates abutting one another face-to-face, said plates consisting alternately of silver and silver chloride respectively, and formed with an aligned bore, and a silver base member comprising a rod of slightly larger diameter than said bore and being press-fitted therein so that said plates are in positive mechanical connection with one another, said silver plates being electrically connected to said silver base member.

5. Electrode of high current-carrying capacity for measuring voltage in a system providing cathodic protection against corrosion, comprising a silver base member, and a plurality of plates abutting one another face-to-face, said plates consisting alternately of silver and silver chloride, respectively, secured on said base member so that said plates are mechanically fixed to one another, said base member being electrically connected to the silver plates and having a threaded extension for mounting the electrode.

6. Electrode according to claim 5 wherein said threaded extension is formed with an axial bore adapted to receive an electrical plug.

References Cited
UNITED STATES PATENTS

| | | | |
|---|---|---|---|
| 2,822,324 | 2/1958 | Gaylor et al. | 204—291 XR |
| 3,047,488 | 7/1962 | Laird et al. | 204—195 |
| 3,129,161 | 4/1964 | Anderson et al. | 204—195 XR |

HOWARD S. WILLIAMS, *Primary Examiner.*

D. R. JORDAN, *Assistant Examiner.*